United States Patent [19]

Hayashi et al.

[11] Patent Number: 5,995,465
[45] Date of Patent: Nov. 30, 1999

[54] DIGITAL SIGNAL REPRODUCING APPARATUS

[75] Inventors: Hideki Hayashi; Masaru Umezawa; Hideki Kobayashi, all of Tokorozawa, Japan

[73] Assignee: Pioneer Electronic Corporation, Japan

[21] Appl. No.: 08/949,035

[22] Filed: Oct. 10, 1997

[30] Foreign Application Priority Data

Oct. 11, 1996 [JP] Japan ................................. P 8-289316

[51] Int. Cl.$^6$ ........................................................ G11B 7/00
[52] U.S. Cl. ................... 369/59; 369/47; 369/124
[58] Field of Search ............................... 369/124, 59, 47, 369/48, 50; 360/39, 43, 51

[56] References Cited

U.S. PATENT DOCUMENTS

| | | | |
|---|---|---|---|
| 5,327,300 | 7/1994 | Satomura | 369/47 |
| 5,528,574 | 6/1996 | Takeuchi et al. | 369/50 |
| 5,535,183 | 7/1996 | Miura et al. | 369/50 |
| 5,663,945 | 9/1997 | Hayashi et al. | 369/124 |
| 5,677,802 | 10/1997 | Saiki et al. | 369/59 |
| 5,680,380 | 10/1997 | Taguchi et al. | 369/59 |

Primary Examiner—Thang V. Tran
Attorney, Agent, or Firm—Finnegan, Henderson, Farabow, Garrett & Dunner, L.L.P.

[57] ABSTRACT

A digital signal reproducing apparatus has the clock signal generating device 24 having: a frequency setting device 12 for setting a desired frequency on the basis of the predetermined linear velocity and a radius position of a pickup 1; a first frequency difference signal generating device 242 for generating a binary signal E corresponding to a difference between the desired frequency fsd and the frequency fs of the sample clock signal A to be used for reproducing a reproduction digital signal; a second frequency difference signal generating device 243 for generating a pulse signal L corresponding to a difference between the frequency based on the reproduction digital signal and the frequency fs of the sample clock signal A; a phase difference signal generating device 244 for generating a pulse signal Y corresponding to a difference between the phase based on the reading signal read from the disc and the phase of the sample clock signal A; and a synchronizing device 24 for synchronizing the frequency fs and phase of the sample clock signal A with the frequency of the reading signal on the basis of the binary signal E, the pulse signal L and the pulse signal Y.

7 Claims, 7 Drawing Sheets

DIGITAL SIGNAL REPRODUCING APPARATUS

BACKGROUND OF THE INVENTION

1. Field of the Invention

The present invention generally relates to a digital signal reproducing apparatus for reproducing a digital signal recorded on an optical disc, and especially relates to the digital signal reproducing apparatus having a clock signal generating circuit for generating a clock signal which is synchronized with reproduction timing of the digital signal recorded on the optical disc.

2. Description of the Related Art

FIG. 10 is a simplified block diagram showing a construction of a CD (Compact Disc) player, which is one example of the digital signal reproducing apparatus.

In FIG. 10, CD 30, which is one example of an optical disc, is rotated in rotation velocity according to a predetermined linear velocity by a spindle motor 2. The spindle motor 2 is driven on the basis of a rotation control signal supplied from a spindle servo circuit 9. A pickup 1 irradiates a light beam to the CD 30, and accepts a reflected light which is reflected in the CD 30 and is interfered in a row of pits formed on the CD 30. Further, the pickup 1 is generates a reading signal corresponding to quantity of acceptance of the reflected light. A head amplifier 4 amplifies the generated reading signal with a suitable amplification factor, and supplies this amplified reading signal to an equalizer 5, which is one example of a waveform equalizing circuit.

The equalizer 5 has a frequency characteristic to emphasize a predetermined high frequency band in the amplified reading signal. Further, the equalizer 5 compensates a waveform of the amplified reading signal by this frequency characteristic, and supplies this compensated reading signal to comparator 6. Namely, the equalizer 5 forcibly makes the amplitude of the high frequency component in the reading signal higher in order to compensate a lack (decrease) of the amplitude the high frequency component in this signal.

The comparator 6 compares the level of the reading signal compensated its waveform by the equalizer 5 with a predetermined reference voltage, and generates a binary signal corresponding to the result of this comparison.

A clock generation circuit 7 is constructed by the so called PLL (Phase Locked Loop) circuit having: a phase comparison circuit 701 for comparing the phase of the binary signal supplied from the comparator 6 with that of a sample clock signal supplied from a VCO (Voltage Control Oscillator) 703, which is one example of a voltage control oscillator, and for outputting a phase error signal; an LPF (Low Pass Filter) 702 for restricting a frequency band of the phase error signal; and the VCO 703 for generating a clock signal according to the phase error signal outputted from the LPF 702. This clock generation circuit 7 generates the sample clock signal whose phase is synchronized with that of the edge of the binary signal.

A sampling circuit 8 samples the above mentioned binary signal at the timing corresponding to the sample clock signal, and sequentially outputs this sampled data as a reproduction digital signal.

On the other hand, this CD player further has a position detecting circuit 10 and a frequency detecting circuit 11. The position detecting circuit 10, for example, optically or mechanically reads a scale (graduation which indicates the radius position of the disc) disposed on a slider base on which a slider to move the pickup 1 in the radius direction of the disc is mounted, and outputs a position detecting signal to be used for recognizing the position of pickup 1 in the radius direction of the disc. The frequency detecting circuit 11 detects the rotation velocity (rotation frequency) of the spindle motor 2 which gives the rotation to the CD 30, and outputs a frequency detecting signal. Further, each of the detection signals outputted the position detecting circuit 10 and the frequency detecting circuit 11 is respectively supplied to a CPU 12.

The CPU 12 controls the access operation to move the pickup 1 at the determined reproduction radius position on the basis of the supplied the position detecting signal, and gives an instruction to the spindle servo circuit 9 in order to set the rotation velocity of the CD 30 at the reproduction radius position. Here, on the CD 30, information are recorded by CLV (Constant Linear Velocity). Hereinbelow, it is referred to as "CLV disc".

As mentioned above, in this CD player, firstly, the pickup 1 is moved at the determined reproduction radius position, and the spindle motor 2 i.e., CD 30 is rotated in the predetermined rotation velocity on the basis of the constant linear velocity. Then, the reading signal is read from the CD 30, and then, the binary signal is generated on the basis of the reading signal, and further, the sample clock signal synchronized with the edge of the binary signal is generated, and the reproduction digital signal is generated by sampling the binary signal at the timing corresponding to the sample clock signal, thereafter, this reproduction digital signal is outputted.

Here, when the reproduction digital signal is generated on the basis of the binary signal, the frequency of the sample clock signal must be sufficiently stable or be fixed. Therefore, in the above mentioned CD player, the reproduction digital signal is generated in the condition that the CD 30 i.e., the spindle motor 2 is sufficiently rotating in accordance with the predetermined rotation velocity on the basis of the constant linear velocity.

However, the weight of the disc affects the spindle motor 2 as load, for example, when the rotation velocity of the disc is changed. Therefore, response speed of the spindle motor 2 is generally bad (slow) because of inertia force of the load. Thus, in the CD player for reproducing the CLV disc, the time period when the pickup 1 is moved to the determined reproduction radius position from a different position and the operation to read the record information from the disc is started, i.e., the access time period, is long. Namely, the time period when the rotation velocity of the spindle motor 2 changes to and reaches the predetermined rotation velocity at the reproduction radius position is long. On the other hand, if the torque of the spindle motor 2 is increased, its response speed is fast. However, if the torque is increased, large electric current need to be applied to the spindle motor 2, the spindle servo circuit 9, etc, so that the temperature in the apparatus (CD player) rise because of heat generated by the applied electric current. Therefore, a cooling device, a cooling system, etc need to be added to the CD player, so that the size of the apparatus (CD player) becomes large. Especially, in case of a reproducing apparatus for reproducing a CD-ROM on which computer software is recorded, which is another example of the digital signal reproducing apparatus, since this reproducing apparatus is generally disposed in the housing of computer, the size of this reproducing apparatus is restricted. Therefore, it is undesirable that the size of this apparatus becomes large.

In order to solve the aforementioned problem and undesirability, it is to be desired that the operation to read the record information from the disc can be started when the access operation is finished, i.e., when the operation that the pickup 1 is moved as far as the determined reproduction radius position is finished. That is to say, it is to be desired that the operation to read the record information from the disc can be started without waiting for the time period when the rotation velocity of the spindle motor 2 reaches the predetermined rotation velocity at the reproduction radius position. In order to satisfy this desire, it is require that even if the rotation velocity of the spindle motor 2 i. e., CD 30 dose not become the predetermined rotation velocity by the constant linear velocity, the clock signal generating circuit 7 generates the sample clock signal whose frequency and phase are synchronized with those of the edge of the binary signal on the basis of the reading signal read from the CD 30 at the reproduction radius position in order to reproduce data (in order to output this reproduction digital signal).

SUMMARY OF THE INVENTION

It is therefore an object of the present invention to provide a digital signal reproducing apparatus in which the sample clock signal, whose at least frequency is synchronized with that of the reading signal read from a disc, can be generated immediately after the transference of the reading device (pickup) by the access operation.

According to the present invention, the above mentioned object can be achieved by a digital signal reproducing apparatus for reproducing digital signal comprising: a rotation control device for controlling a rotation velocity of a disc, on which information is recorded, in accordance with a predetermined linear velocity; a reading device for reading the information from the rotated disc, and for generating a reading signal corresponding to the read information; a clock signal generating device for generating a sample clock signal whose at least frequency is synchronized with a frequency of the reading signal; a decoding device for decoding the digital signal from the reading signal on the basis of the sample clock signal; and a transferring device for transferring the reading device to a radius position of the disc in order to read the information recorded at the radius position of the disc by the reading device, the clock signal generating device comprising: a frequency setting device for setting a desired frequency on the basis of the predetermined linear velocity and the radius position of the reading device; a first frequency difference signal generating device for generating a fist difference signal corresponding to a difference between the desired frequency and the frequency of the sample clock signal; a second frequency difference signal generating device for generating a second difference signal corresponding to a difference between a frequency based on the digital signal and the frequency of the sample clock signal; a phase difference signal generating device for generating a third difference signal corresponding to a difference between a phase based on the reading signal and a phase of the sample clock signal; and a synchronizing device for synchronizing at least the frequency of the sample clock signal with the frequency of the reading signal on the basis of at least one difference signal among the first difference signal, the second difference signal and the third difference signal.

Thus, if the change of the rotation velocity of the disc by the rotation control device is much slower than the transference of the reading device in the radius direction of the disc by the transferring device, when the reading device is transferred to a radius position of the disc by the transferring device, the rotation velocity is not change in accordance with the predetermined linear velocity, i.e., the rotation velocity still remains prior velocity. Therefore, in this time, the real frequency of the reading signal is different from a normal frequency of the reading signal which indicates a frequency of the reading signal when the rotation velocity of the disc is the predetermined linear velocity.

In this condition, in the clock signal generating device, the frequency setting device is set the desired frequency on the basis of the predetermined linear velocity and the radius position of the reading device. Therefore, this desired frequency accords to or is in proportion to the real frequency of the reading signal. Then, the first frequency difference signal generating device generates the fist difference signal corresponding to a difference between the desired frequency and the frequency of the sample clock signal, and the second frequency difference signal generating device generates the second difference signal corresponding to a difference between the frequency based on the digital signal which is decoded on the basis of the reading signal and the frequency of the sample clock signal, and further, the phase difference signal generating device for generates the third difference signal corresponding to a difference between the phase based on the reading signal and the phase of the sample clock signal. Then, the synchronizing device synchronizes the frequency and/or the phase of the sample clock signal with the frequency of the reading signal on the basis of at least one difference signal among the first difference signal, the second difference signal and the third difference signal.

Thus, if the real frequency of the reading signal is different from a normal frequency of the reading signal immediately after the transference of the reading device, the frequency and/or the phase of the sample clock signal can be synchronized with the real frequency and/or the real phase of the reading signal. Therefore, the reproduction of information recorded on the disc can be accurately carried out immediately after the transference of the reading device, so that the high speed access operation can be realized.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

In addition, in the following description, a digital signal reproducing apparatus for reproducing a DVD will be explained as an embodiment of the present invention. The DVD is a high density recording medium, whose recording capacity is much larger than that of a CD. Therefore, the DVD is capable of recording not only digital audio signals but also digital picture signals to reproduce one movie, regardless of compact size.

Figure 1:
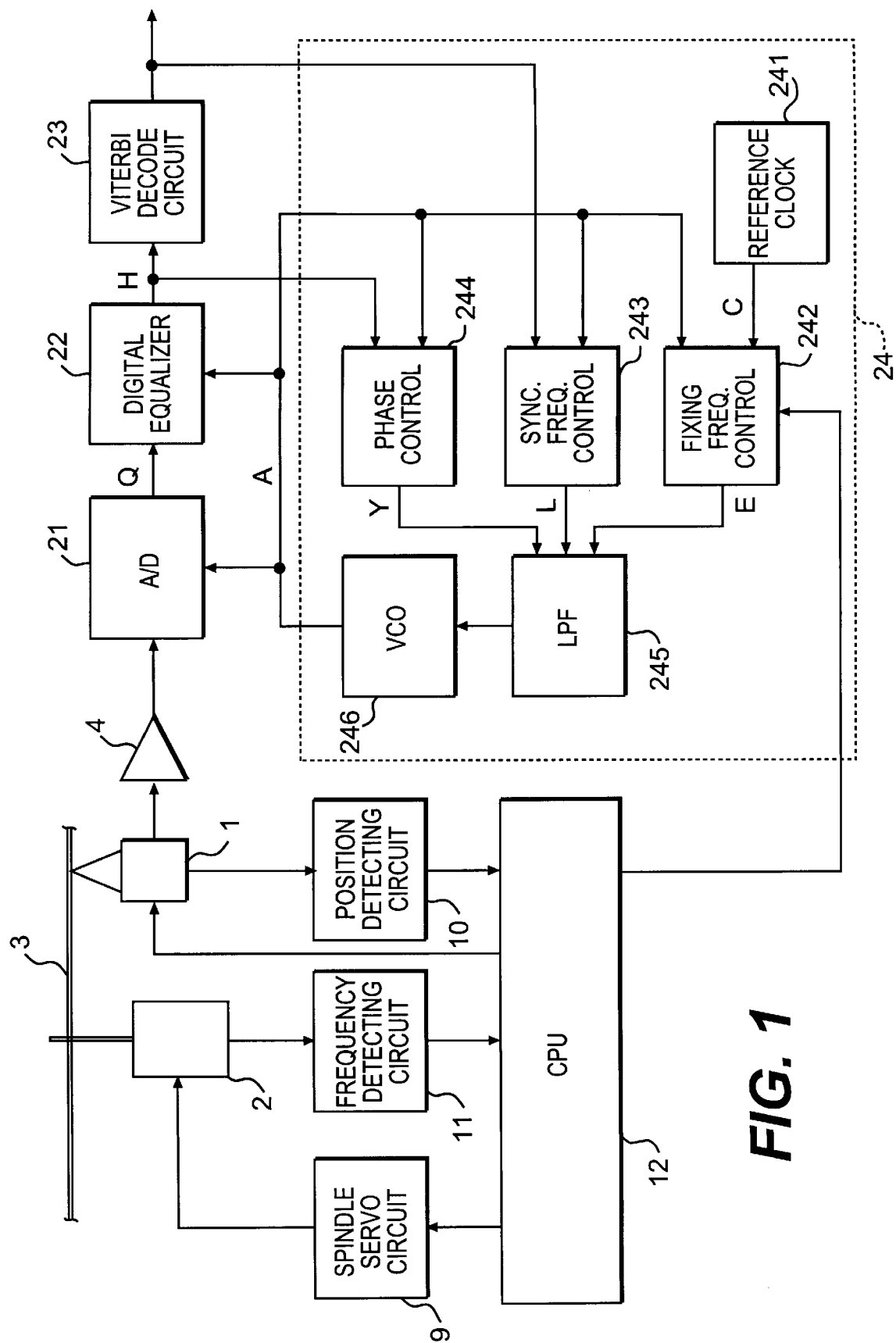
FIG. 1 is a block diagram showing a construction of one example of a digital signal reproducing apparatus for reproducing a DVD according to an embodiment of the present invention.
Figure 10:
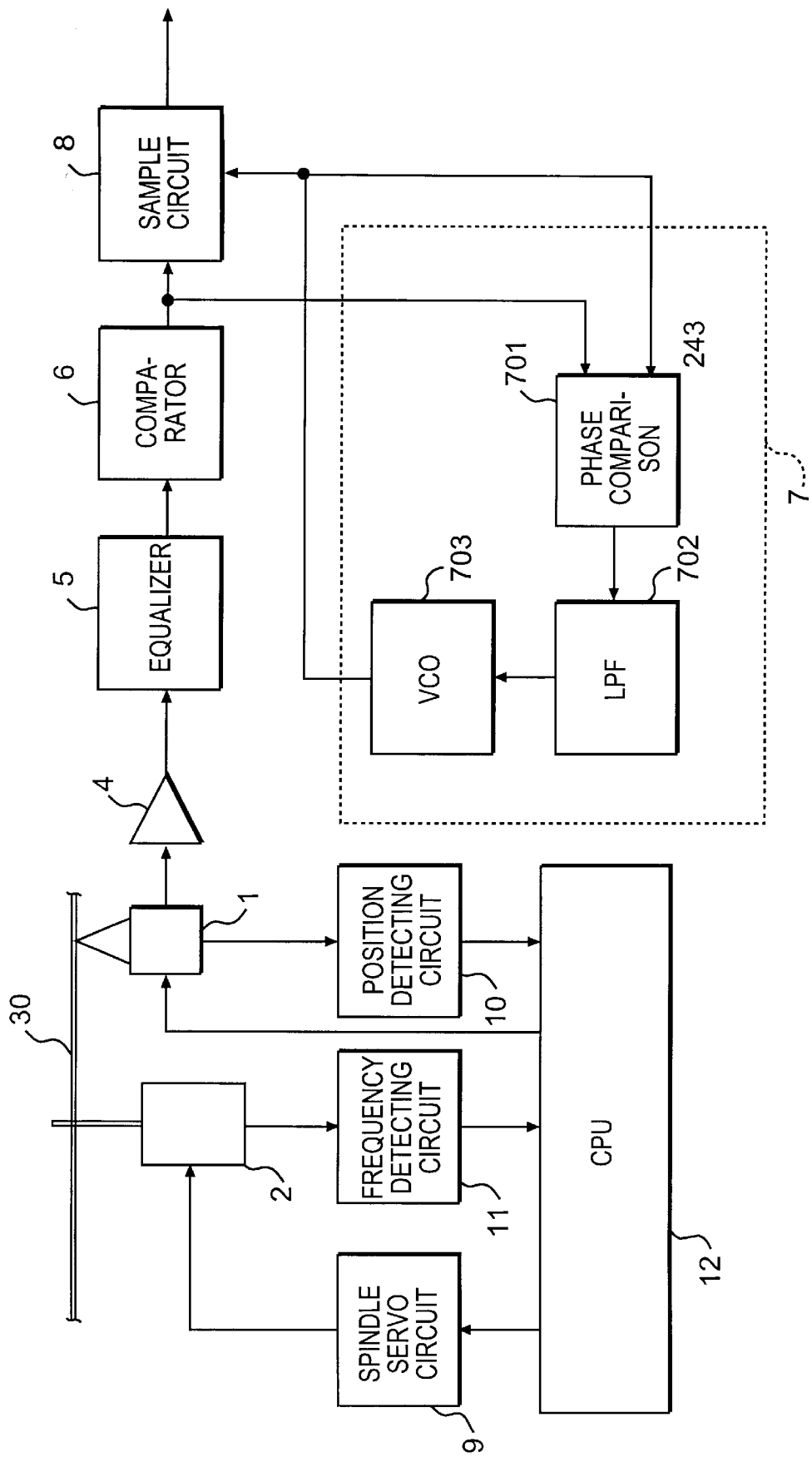
FIG. 10 is a block diagram showing a construction of a CD player.

FIG. 1 is a block diagram showing a construction of the digital signal reproducing apparatus for reproducing a DVD according to the embodiment. In FIG. 1, same constructional elements as those in FIG. 10 carry the same reference numbers and the explanations thereof are omitted.

In FIG. 1, a DVD 3 is rotated by a spindle motor 2. Information is recorded on the DVD 3 as a row of pits. The DVD 3 is the CLV disc, so that the DVD 3 is rotated in accordance with a linear velocity in order to reproduce recorded information.

In FIG. 1, a pickup 1 irradiates a light beam to the DVD 3. Further, this pickup 1 accepts a reflected light which is reflected in the DVD 3, and generates a reading signal whose lever corresponds to the quantity of acceptance of the reflected light. A head amplifier 4 amplifies the generated reading signal with a suitable amplification factor, and supplies this amplified reading signal to an A/D converter 21. The A/D converter 21 samples the amplified reading signal at the timing corresponding to a sample clock signal supplied the undermentioned clock signal generating circuit 24, and converts the sampled reading signal into a sampling value Q constructed by 8 bit, for example, and further, supplies this to a digital equalizer 22. Thus, the sampling value Q corresponding to the signal level of the reading signal is sequentially supplied to the digital equalizer 22.

The digital equalizer 22 adjusts the value of the sampling value Q such that the amplitude of the series of the sampling value Q is increased, as the frequency at the time of changing rising trend into falling trend or changing falling trend into rising trend (hereinbelow, it is referred to "input sample frequency".) is higher in the frequency band corresponding to the frequency of the sample clock signal supplied from the clock signal generating circuit 24. In this manner, the digital equalizer 22 generates a waveform compensated sampling value H.

Namely, the digital equalizer 22 raises the high frequency component of the reading signal by the gain characteristic corresponding to the frequency of the sample clock signal and an equalizing coefficient k in the aforementioned process. Thus, the waveform compensated sampling value H, which is corresponds to the signal generated by amplifying the amplitude of the high frequency component included in the reading signal, is obtained. In addition, the frequency of the high frequency component is decided by the rotation velocity of the disc.

Figure 2:
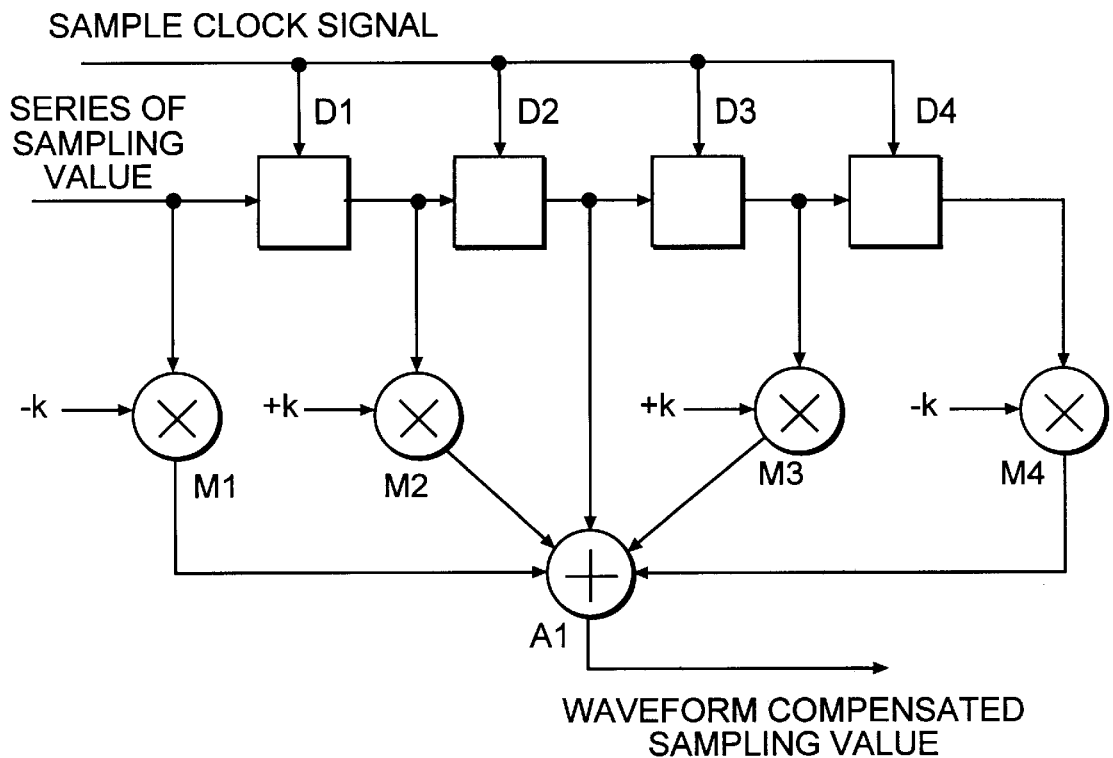
FIG. 2 is a block diagram showing a construction of a digital equalizer according to the embodiment of the preset invention.

FIG. 2 is a circuit diagram showing the digital equalizer 22 constructed by an FIR (Finite Impulse Response) filter.

In FIG. 2, a multiplier M1 multiplies the supplied sampling value Q and −k (negative equalizing coefficient), and supplies the value obtained by this multiplication to an adder A1. A multiplier M2 multiplies the sampling value Q delayed for one clock timing by a D flip-flop D1 and +k, and supplies the value obtained by this multiplication to the adder A1. A multiplier M3 multiplies the sampling value Q delayed for two clock timing by a D flip-flops D2 and D3 and +k, and supplies the value obtained by this multiplication to the adder A1. A multiplier M4 multiplies the sampling value Q delayed for one clock timing by a D flip-flop D4 and −k, and supplies the value obtained by this multiplication to the adder A1. The adder A1 adds all of the multiplication result obtained by the multipliers M1 to M4, and the sampling value Q supplied from D flip-flop D2 and delayed for two clock timing, and outputs the value obtained by this addition as the waveform compensation sampling value H.

Figure 3:
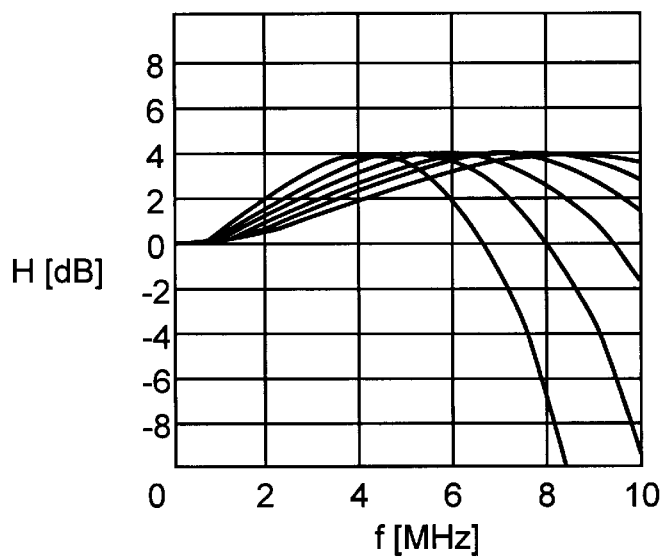
FIG. 3 is a diagram showing a frequency band characteristic with respect to a clock signal frequency in the digital equalizer when an equalizing coefficient k is constant.

FIG. 3 is a diagram showing a characteristic of the circuit shown in FIG. 2. The transfer function is shown below.

$$H(f) = 1 + 2k \cos(2\pi f/fs) - 2k \cos(4\pi f/fs)$$

H(f): Transfer Function
f: Input Sample Frequency
fs: Frequency of Sample Clock Signal Namely, the circuit shown in FIG. 2 is an equalizer set an impulse response comprising (−k, +k, 1, +k, −k). In the circuit, if the equalizing coefficient k supplied from a CPU 12 is constant, the frequency band characteristic (peak frequency) is changed in accordance with the change of the frequency fs of the sample clock signal supplied from the clock signal generating circuit 24, and the amplitude of the waveform compensated sampling value H is increased, as the input sample frequency f of the sampling value Q sequentially inputted from the A/D converter 21 is higher in the frequency band decided by the frequency fs of the sample clock signal.

In this manner, in the digital equalizer 22 shown in FIG. 2, its frequency band characteristic is changed in accordance with the frequency fs of the sample clock signal. Here, the frequency fs of the sample clock signal is synchronized with that of the reading signal read from the disc. Therefore, when the rotation velocity of the disc is changed by the high speed access etc, the frequency fs of the sample clock signal is changed in accordance with the change of the rotation velocity of the disc. Thus, the frequency band characteristic of the digital equalizer 22 is automatically changed in accordance with the change of the rotation velocity of the disc. As a result, the CPU 12 does not carried out any control operations for the frequency band characteristic of a waveform equalizing circuit (digital equalizer 22) more than initializing the equalizing coefficient k.

In addition, the aforementioned digital equalizer 22 is constructed by the D flip-flops of the 4-stage cascade arrangement and has 5 taps. However, the construction of the digital equalizer is not restricted.

Further, in another DVD reproducing apparatus which is capable of reproducing a plural kinds of disc whose recording density are different from each other, the equalizing coefficient is changed in correspondence with each kind of disc, so that it is possible to set the quantity of emphasis of the high frequency band in correspondence with each kind of disc.

The waveform compensated sampling value H outputted from the digital equalizer 22 is supplied to a viterbi decode circuit 23 and the sample clock circuit 24 respectively.

The viterbi decode circuit 23 recognizes the waveform compensated sampling value H as a sequential time series, and calculates a decode data series whose existence probability is the highest with respect to this sampling value series, and further, the viterbi decode circuit 23 outputs this data as a reproduction digital signal.

The clock signal generating circuit 24 synchronizes a reference frequency according to the constant linear velocity of the disc, which is determined by the CPU 12, with the frequency of the sample clock signal, and synchronizes the phase of this sample clock signal with that of the series of the waveform compensated sampling value H supplied from the digital equalizer 22. Namely, the clock signal generating circuit 24 generates the sample clock signal whose frequency and phase are synchronized with those of reading signal.

Here, the construction of the clock signal generating circuit 24 will be explained with referring to FIG. 1.

The clock signal generating circuit 24 has a reference clock generating device 241, a fixing frequency control circuit 242, a synchronizing frequency control circuit 243, a phase control circuit 244, an LPF 245, and VCO 246.

The reference clock generating device 241 has, for example, a crystal oscillating circuit and a frequency dividing circuit for dividing the high frequency of the pulse signal generated by the crystal oscillating circuit in a predetermined dividing ratio. This reference clock generating device 241 generates a pulse signal whose frequency is set in the predetermined frequency, as the reference clock signal C. It is preferable that the frequency of the reference clock signal C is a frequency which is an integer times or one time as high as the frequency of the sample clock signal which is generated when the DVD is normally rotated in the linear velocity prescribed by the DVD format. However, the frequency of the reference clock signal C is not restricted. It is required that the reference clock signal C must be a pulse signal whose frequency is stable and whose oscillating state is extremely precise.

The fixing frequency control circuit 242 detects a difference between a desired frequency fsd, which is determined by a dividing ratio M, a reference value N respectively supplied from a CPU 12, and the frequency fs of the sample clock signal A supplied from the VCO 246. Then, this fixing frequency control circuit 242 outputs the detected frequency difference as a binary signal E.

The synchronizing frequency control circuit 243 detects a difference between a frequency which is an integer times as high as the frequency of a synchronization signal and the frequency of the sample clock signal supplied from the VCO 246. Here, the synchronization signal is included in the reproduction digital signal supplied from the viterbi decode circuit 23. Then, this synchronizing frequency control circuit 243 outputs the detected frequency difference as a pulse signal L.

The phase control circuit 244 samples a sampling value closest to a zero-cross point among the series of the inputted waveform compensated sampling value, and detects a phase difference on the basis of the level of this sampled sampling value. Then, this phase control circuit 244 outputs the detected phase difference as a pulse signal Y.

Further, the binary signal E outputted from the fixing frequency control circuit 242, the pulse signal L outputted from the synchronizing frequency control circuit 243 and the pulse signal Y outputted from the phase control circuit 244 are respectively supplied to the VCO 246 passing through the LPF 245. Therefore, the VCO 246 outputs a clock signal (sample clock signal) whose frequency and phase correspond to those binary signal E and pulse signals L and Y.

Figure 4:
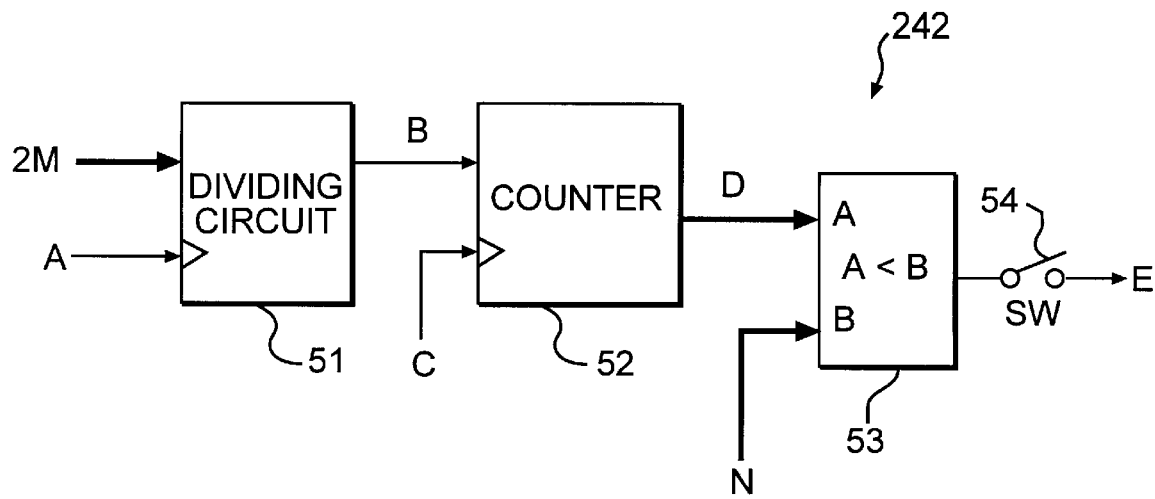
FIG. 4 is a block diagram showing a construction of a fixing frequency control circuit according to the embodiment of the present invention.

FIG. 4 shows the concrete construction of the fixing frequency control circuit 242.

In FIG. 4, a dividing counter 51 divides the frequency of the sample clock signal A supplied from the VCO 246 on the basis of the dividing ratio M supplied from the CPU 12, and generates a pulse signal B whose level is high during one clock period at time interval when this dividing counter 51 counts 2 M of the sample clock signal. Then, this dividing counter 51 outputs this generated pulse signal B to an instrumentation counter 52. The instrumentation counter 52 resets a zero to its instrumentation value when the high level of pulse signal B is inputted therein. Further, this instrumentation counter 52 counts the reference clock signal C supplied from the reference clock signal generating device 241 while the level of the pulse signal B is low, and outputs this counting value D to a comparator 53. The comparator 53 compares the counting value D outputted from the instrumentation counter 52 with the reference value N decided by the CPU 12, and outputts the binary signal E whose level is high while the counting value D is smaller than that of the reference value N and whose level is low while the counting value D is larger than that of the reference value N. This binary signal E is supplied to the LPF 245 passing through a switcing circuit 54. In this manner, the level of the binary signal E is high during the clock number of the reference clock signal C is smaller than reference value N and its level is low during the rest period among the 2 M clock period of the sample clock signal A. Therefore, if the frequency fs of the sample clock signal A is higher than the undermentioned desired frequency fsd (which is determined by the frequency $f_{ref}$, the dividing ratio M and the reference value N), the rate of the high level period among the 2 M period of the binary signal E, i.e., the duty of the binary signal E is more than 50%. On the other hand, the frequency fs is lower than the reference frequency, this duty is less than 50%. In addition, the 2 M period is one cycle of the binary signal E.

Figure 5:
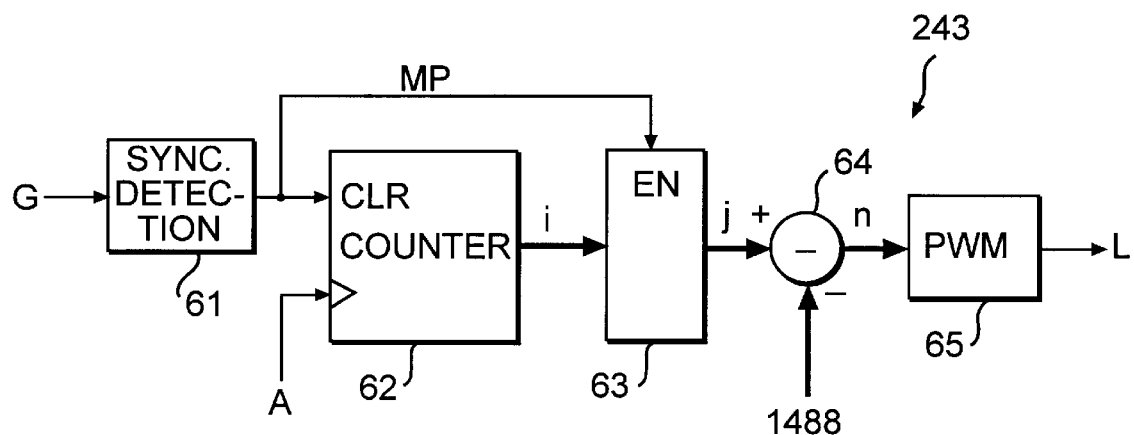
FIG. 5 is a block diagram showing a construction of a synchronizing frequency control circuit according to the embodiment of the present invention.

FIG. 5 shows the concrete construction of the synchronizing frequency control circuit 243.

In FIG. 5, a synchronization detecting device 61 detects a synchronization signal included in the reproduction digital signal supplied from the viterbi decode circuit 23. Here, the synchronization signal is arranged in the reproduction digital signal at predetermined interval and in a constant cycle. For example, one interval of the synchronization signal corresponds to 1488 clocks, namely, the synchronization signal is arranged in record data for each 1488 clocks, in case of the DVD format. This synchronization signal is formed by a singular pattern which is different from an usual data pattern. When the synchronization detecting device 61 detects this singular pattern included in the supplied reproduction digital signal, the synchronization detecting device 61 outputs a detecting pulse MP to an instrumentation counter 62 and register 63 respectively. The instrumentation counter 62 resets zero in a instrumentation value and starts to count the sample clock signal A, when the instrumentation counter 62 accepts the detecting pulse MP. Then, this instrumentation counter 62 supplies the instrumentation value i to an input terminal of the register 63. The register 63 keeps the instrumentation value i supplied from the instrumentation counter 62 during the period between the acceptance of a detecting pulse and the acceptance of the next detecting pulse. Then, the instrumentation value i kept by the register 63 is supplied to a subtraction device 64, as an output value j. The subtraction device 64 subtracts the output value j supplied from the register 63 from the reference value (for example 1488) supplied from the CPU 12, and generates the frequency difference signal n. The frequency difference signal n is supplied to a PMW (Pulse Width Modulation) modulation device 65. Thus, the PWM modulation device 65 outputs a pulse signal L whose duty is in proportion to the frequency difference signal n to the LPF 245.

Figure 6:
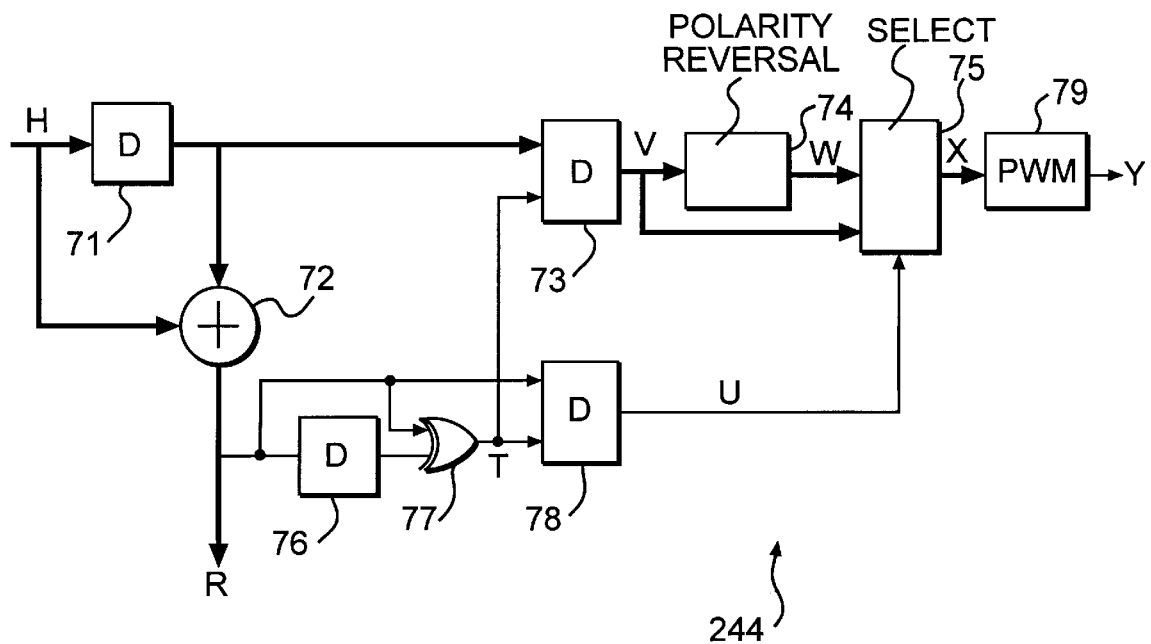
FIG. 6 is a block diagram showing a construction of a phase control circuit according to the embodiment of the present invention.

FIG. 6 shows the concrete construction of the phase control circuit 244.

In FIG. 6, the waveform compensated sampling value H is supplied to a D flip-flop 71 and an adder 72. By the D flip-flop 71, the waveform compensated sampling value is delayed one sampling clock. The adder 72 adds the inputted waveform compensated sampling value and the delayed waveform compensated sampling value supplied from the D flip-flop 71. Thus, the adder 72 generates an average sampling value R on the basis of the waveform compensated sampling value H adjacent to each other.

The average sampling value R is supplied to a D flip-flop 76, and is delayed one sampling clock in the D flip-flop 76. An exclusive OR circuit 77 is determined whether or not the MSB of the average sampling value R and the MSB of the delayed average sampling value supplied from the D flip-flop 46 are equivalent each other. If both MSBs are nonequivalent, the exclusive OR circuit 77 supplies an enable signal T which indicates logic "1" to D-resisters 73 and 78 respectively. On the other hand, if both MSBs are equivalent, an enable signal T which indicates logic "0" to D-resisters 73 and 78 respectively. Here, the fact that both MSBs are nonequivalent indicates that the average sampling value R has been changed a positive value into a negative value or has been changed a negative value into a positive value, i.e., the so called zero-cross condition. When the exclusive OR circuit 77 detects this zero-cross condition, the exclusive OR circuit 77 supplies the enable signal T which indicates logic "1" to the D-registers 73 and 78 respectively. This indicates that the exclusive OR circuit performs as a zero-cross detecting means.

The D-register 73 accepts the delayed waveform compensated sampling value supplied form the D flip-flop 71 only when the enable signal T which indicates logic "1" is supplied to this D-register 73 from the exclusive OR circuit 77. Then, the D-register 73 outputs the accepted waveform compensated sampling value to a polarity reversal circuit 74 and a selection circuit 75 respectively, as an extraction sampling value V.

On the other hand, the D-register 78 accepts the MSB of the average sampling valur r only when the enable signal T which indicates logic "1" is supplied to this D-register 78 from the exclusive OR circuit 77. Then, the D-register 78 outputs the accepted MSB of the average sampling value R to the selection circuit 75, as an inclination signal U. Here, when the average sampling value R is changed a positive value into a negative value, i.e., when the change of the average sampling value R is falling trend, the inclination signal U is logic "1". On the other hand, when the change of the average sampling value R is rising trend, the inclination signal U is logic "0". This inclination signal U is used as a switching control signal of the selection circuit 75. Further, the selection circuit 75 accepts the extraction sampling value V whose polarity is reversed by the polarity reversal circuit 74, the extraction sampling value V directly supplied from the D flip-flop 73 and the inclination signal U supplied from the D-register 78. When the change of the average sampling value R is rising trend, i.e., the inclination signal U is logic "0", the selection circuit 75 selects the reversed extraction sampling value V, and outputs this value to the PWM modulation device 79, as the phase difference signal X. On the other hand, when the change of the average sampling value R is falling trend, i.e., the inclination signal U is logic "1", the selection circuit 75 selects the non-reversed extraction sampling value V, and outputs this value to the PWM modulation device 79, as the phase difference signal X. The PWM modulation device 79 generates a pulse signal Y whose duty is in proportion to the phase difference signal X supplied from the selection circuit 75, and outputs this pulse signal Y to the LPF 245.

As mentioned above, in the phase control circuit 244, the zero-cross zone, which is the period when the average sampling value R based on the waveform compensated sampling value supplied from the digital equalizer 22 is changed a positive value into a negative value or a negative value into a positive value, is detected, and the waveform compensated sampling value existed in this zone is outputted, as the extraction sampling value v. Then, the reversed extraction sampling value V whose polarity is reversed is generated by the polarity reversal circuit 74, and one value among the reversed extraction sampling value V and non-reversed extraction sampling value V is selected and is outputted as the phase difference signal X on the basis of the inclination signal U. Thus, since the average sampling value R is generates on the basis of the waveform compensated sampling signal H supplied from the digital equalizer 22, the phase difference signal X is extremely precise, and thus, the phase of the sample clock signal outputted from the VCO 246 is extremely precise.

Figure 7:
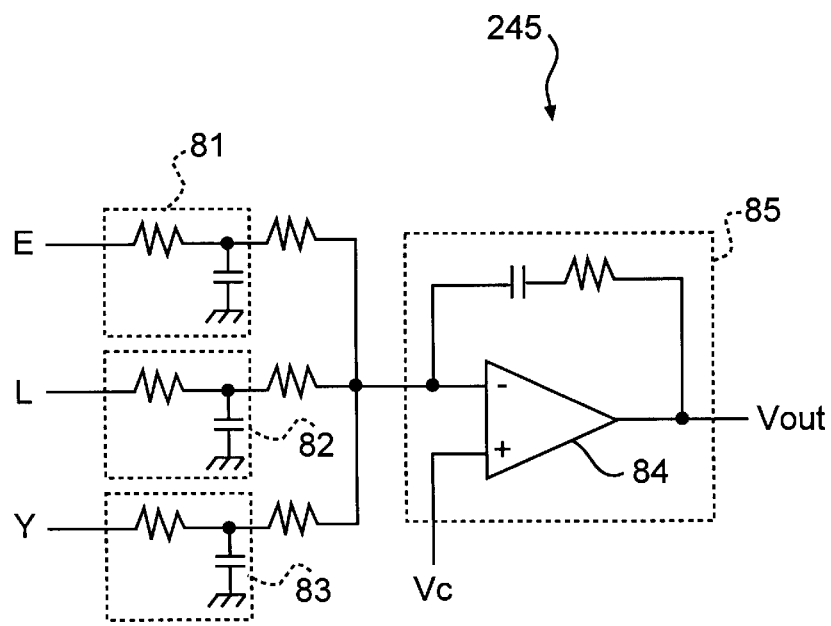
FIG. 7 is a circuit diagram showing a construction of the LPF according to the embodiment of the present invention.

FIG. 7 shows the concrete circuit of the LPF 245.

The LPF 245 has passive filters 81, 82 and 83 constructed by resistors and capacitors, and an active filter 85 having an OP-amp (operational amplifier) 84. The passive filters 81, 82 and 83 smooth each of the binary signal E and pulse signals L and Y outputted from the fixing frequency control circuit 242, the synchronizing frequency control circuit 243 and the phase control circuit 244 respectively. Thus, the passive filters 81, 82 and 83 generate a voltage signal in proportion to the duty of each of the binary signal E and the pulse signals L and Y. Then, the active filter 85 adds all of the voltage signals, and generates a difference voltage signal Vout. The VCO 246 is controlled by this difference voltage signal Vout. In addition, the voltage Vc applied to a plus input terminal of the OP-amp 84 is the same as the average voltage of each of the binary signal E and the pulse signals L and Y when its duty is 50%.

Next, the operation of the CPU 12 to control the clock signal generating circuit 24 will be explained.

The CPU 12 decides the dividing ratio M and the reference value N in order to synchronize the frequency of the sample clock signal with that of the reading signal when the pickup 1 is moved to the determined reproduction radius position and the rotation velocity of the DVD 3 is changed into the predetermined rotation velocity at this reproduction radius position on the basis of the constant linear velocity.

Here, the dividing ratio M and the reference value N determined by the CPU 12 will be explained.

In case that the oscillation frequency of the VCO 246 is controlled by the binary signal E supplied from the fixing frequency control circuit 242, a fixing frequency control loop (the first feedback loop) is constructed by the fixing frequency control circuit 242, the LPF 245 and VCO 246. In the fixing frequency control loop, the binary signal E outputted from the fixing frequency control circuit 242 is integrated by the LPF 245, and thus, the control voltage signal in order to control the oscillation frequency of the VCO 246 is generated by the LPF 245. Namely, the level of this control voltage signal is changed by the duty of the binary signal E. Further, the oscillation frequency of the VCO 246 is changed in proportion to the voltage of the control voltage signal outputted from the VCO 246. Therefore, in the fixing frequency control loop, the feed back control is carried out such that the duty of the binary signal E is 50%. Here, as mentioned above, one cycle of the binary signal E is the period when the clock signal outputted from the VCO 246 is counted to 2 M by the dividing counter 51 shown in FIG. 5. In this one cycle, the level of the binary signal E is high while the counting value D, which is obtained by counting the reference clock C by the instrumentation counter 52, is smaller than the reference value N, and the level of the binary signal E is low during the rest period. Thus, the duty of the binary signal E is decided by the frequency of the clock signal outputted from the VCO 246, the frequency of the reference clock signal C, the dividing ratio M and the reference value N.

Here, the following formula is provided with the construction of the fixing frequency control circuit 242.

$$N/f_{ref}=M/fsd$$

Thus, in the fixing frequency control loop, the feed back control is carried out such that the frequency fs of the sample clock signal A is equalized with the desired frequency fsd decided by the frequency $f_{ref}$ of the reference clock signal C, the dividing ratio M, and the reference value N. Here, the desired frequency fsd is provided with the following formula.

$$fsd=f_{ref}M/N$$

Generally, the speed of the transition of the pickup 1 in the radius direction of the disc is efficiently fast than the response speed of the rotation control of the spindle motor 2 at the time of the search operation. Therefore, while the pickup 1 moves in the search operation, the rotation velocity of the disc is not substantially changed. Thus, the rotation velocity is not substantially different between immediately before starting transference of the pickup 1 in the search operation and immediately after ending transference of the pickup 1 in the search operation.

As a result, in case of the high speed access for the CLV disc, the frequency of the reading signal is different between before transference of the pickup 1 and after transference of the pickup 1. More concretely, in the search operation, if the reading radius position (reproduction radius position) is moved to the outer circumference of the disc, the frequency of the reading signal obtained immediately after transference of the pickup 1 becomes higher. On the other hand, if the reading radius position is moved to the inner circumference of the disc, the frequency of the reading signal obtained immediately after transference of the pickup 1 becomes lower.

Therefore, the CPU 12 decides the dividing ratio M and the reference value N on the basis of the radius position of the pickup 1 before transference and after transference in the search operation. More concretely, the dividing ratio M is decides on the basis of the radius position after transference of the pickup 1. The reference value N is decided on the basis of the radius position before transference of the pickup 1. For example, when the CPU 12 carries out the search operation from the most inner circumference of the disc to the most outer circumference of the disc, the pickup 1 moves 24 mm radius position into 58 mm radius position. Therefore, M/N (ratio of M and N, i.e., M:N) is set in 58/24 by the CPU 12.

In addition, the search operation indicates the operation that the pickup 1 is transferred to a radius position of the disc from the different radius position, for example, the operation that the pickup 1 is transferred to a determined reproduction radius position, and the rotation velocity of the spindle motor 2 is changed into predetermined rotation velocity at this determined reproduction radius position on the basis of the linear velocity.

Further, the frequency of the reference clock signal C is set such that it is equalized with the frequency of the sample clock signal obtained when the rotation velocity of the disc is controlled in the linear velocity prescribed by the DVD format. However, the frequency of the reference clock signal C is not restricted. The this frequency can be adjusted by using a adjustment coefficient.

Further, the CPU 12 watches on the data operation condition, for example, error correcting operation condition of the reproduction digital signal outputted from the viterbi decode circuit 23. Then, when the CPU 12 detects that this data operation is normally started, the CPU 12 makes the switch 54 open, and thus, the fixing frequency control loop is cut out.

In this manner, the dividing ratio M and the reference value N is decided by the CPU 12. Thus, the frequency of the sample clock signal outputted the clock signal generating circuit 24 immediately after transference of the pickup 1 is equalized with the frequency of the reading signal immediately after transference of the pickup 1.

If the frequency of the sample clock signal is substantially equalized with that of the reading signal, the synchronization signal included in the reproduction signal supplied from the viterbi decode circuit 23 can be detected by the synchronizing frequency control circuit 243, and the pulse signal L, which accords to the frequency difference, is obtained. Thus, in a synchronizing frequency control loop (the second feedback loop) constructed by the synchronizing frequency control circuit 243, the LPF 245 and the VCO 246, the frequency of the sample clock signal is adjusted by the pulse signal L based on the synchronization signal such that the frequency of the sample clock signal is synchronized with that of the reading signal, that is to say, the frequency of the sample clock signal is synchronized with the frequency which is 1488 times as high as the detection frequency of the synchronization signal (Note that the synchronization signal is arranged in the recording data for each 1488 clocks).

Similarly, If the frequency fs of the sample clock signal is substantially equalized with that of the reading signal, and further, the frequency fs of the sample clock signal is accurately synchronized with the frequency of the reading signal, the phase synchronization with the series of the reproduction digital signal can be carried out by the phase control circuit 244.

In this manner, the sample clock signal is completely synchronized with the reading signal and the reproduction digital signal by the synchronizing frequency control circuit 243 and the phase control circuit 244. After this, if the frequency of the reading signal is changed in accordance with the change of the rotation velocity of the spindle motor 2 by a spindle servo in the search operation, the frequency and phase of the sample clock signal is changed in accordance with the change of those of reading signal, so that the synchronization of the sample clock signal and the reading signal remains. In this manner, the CPU 12 only sets the dividing ratio M and the reference value N, and cuts out the fixing frequency control loop when the CPU 12 recognized the fact that the data operation (reproducing operation) is normally started. Therefore, the CPU 12 does not need to control with respect to the change of the frequency of the reading signal caused by the rotation velocity of the spindle motor 2.

Figure 8:
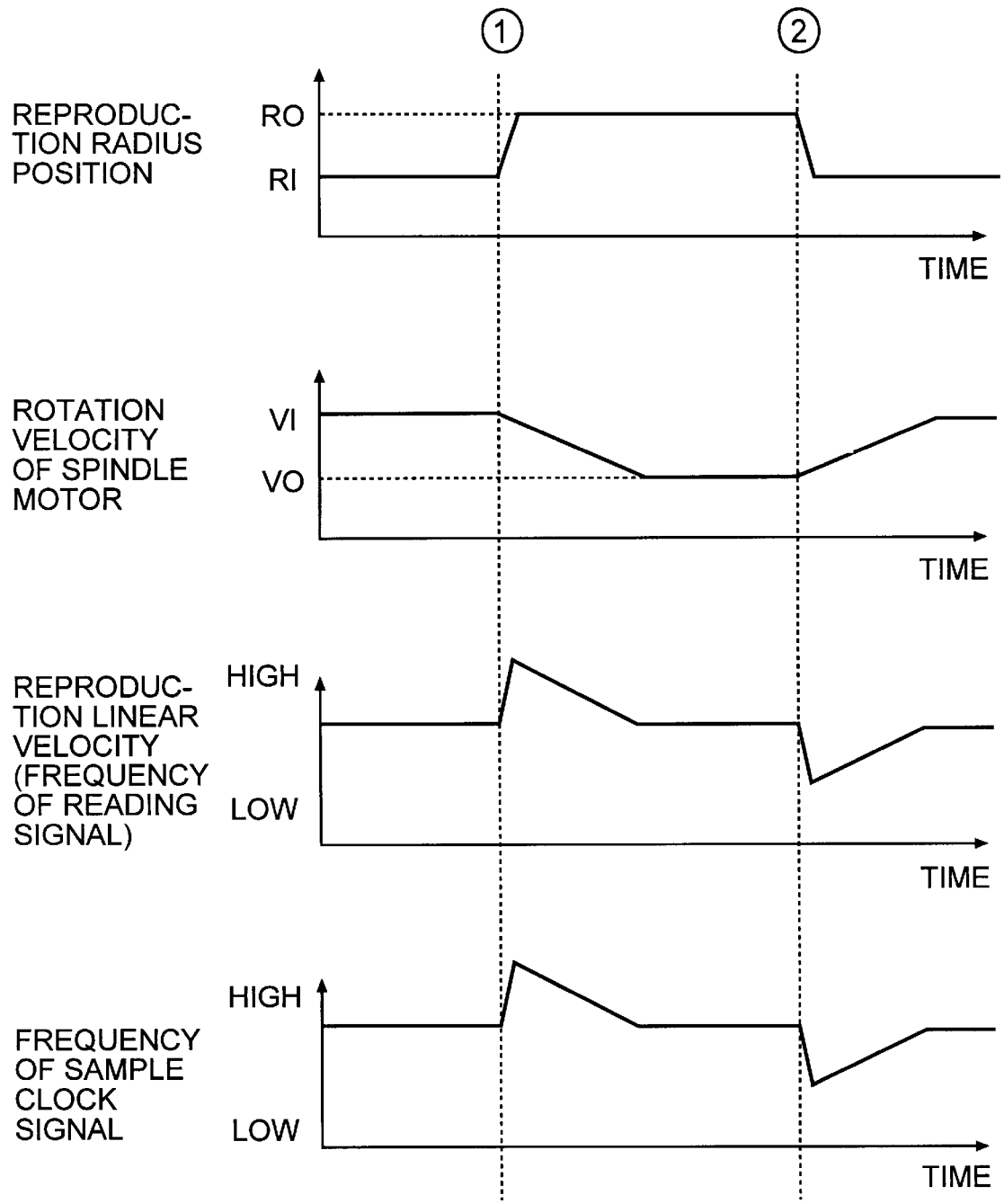
FIG. 8 is a diagram showing changes of a reproduction radius, a velocity of a spindle motor, a reproduction linear velocity and frequency of a sample clock signal, when a high velocity access is carried out.

FIG. 8 shows changes of a reproduction radius, a velocity of a spindle motor 2, a reproduction linear velocity and frequency of a sample clock signal, when a high speed access is carried out.

A position ① in FIG. 8 indicates the condition when the pickup 1 is tranferred from an inner position RI to an outer position RO in the radius direction of the disc. On the other hand, a position ② indicates the condition when the pickup 1 is transferred from the outer position RI to the inner position RO. At the position ①, the rotation velocity of the spindle motor 2 is slowly changed a velocity VO into a velocity VI, while transference of the pickup 1 is fast. Therefore, when pickup 1 reaches the outer position RO, the rotation velocity of the spindle motor 2 is still the velocity VI, so that the reproduction linear velocity of the disc, i.e., the frequency of the reading signal is increased.

At this moment, the CPU 12 generates the dividing ratio M and the reference value N on the basis of the inner position RI and outer position RO. Therefore, the desired frequency fsd is determined. Namely, the desired frequency fsd is determined in accordance with the preset rotation velocity of the spindle motor at the outer position RO. Further, the feed back control is carried out such that the frequency fs of the sample clock signal is equalized with the desired frequency fsd in the fixing frequency control loop 242, 245 and 246. Further, the frequency fs of the sample clock signal is accurately synchronized with that of reading signal on the basis of the synchronization signal included in the reproduction digital signal in the synchronizing frequency control loop 243, 245 and 246. Further, the phase of the sample clock signal is synchronized with that of the reading signal on the basis of the series of the waveform compensated sample value in the phase control loop 244, 245 and 246 (the third feedback loop). Further, the frequency and phase of the sample clock signal is changed in accordance with the change of the those of the reading signal. Namely, the frequency and phase of the sample clock signal is followed the rotation velocity of the spindle motor 2 which is slowly changed the velocity VI into the velocity VO.

Similarly, at the position ②, the rotation velocity of the spindle motor 2 is slowly changed a velocity VI into a velocity VO. Therefore, when pickup 1 reaches the inner position RI, the rotation velocity of the spindle motor 2 is still the velocity VO, so that the reproduction linear velocity of the disc, i.e., the frequency of the reading signal is decreased.

At this moment, the CPU 12 generates the dividing ratio M and the reference value N on the basis of the inner position RI and outer position RO. Therefore, the desired frequency fsd is determined. Namely, the desired frequency fsd is determined in accordance with the preset rotation velocity of the spindle motor 2 at the inner position RI. Further, the feed back control is carried out such that the frequency fs of the sample clock signal is equalized with the desired frequency fsd in the fixing frequency control loop. Further, the frequency fs of the sample clock signal is accurately synchronized with that of reading signal on the basis of the synchronization signal included in the reproduction digital signal in the synchronizing frequency control loop. Further, the phase of the sample clock signal is synchronized with that of the reading signal on the basis of the series of the waveform compensated sample value in the phase control loop. Further, the frequency and phase of the sample clock signal is changed in accordance with the change of the those of the reading signal. Namely, the frequency and phase of the sample clock signal is followed the rotation velocity of the spindle motor 2 which is slowly changed the velocity VO into the velocity VI.

As mentioned above, since the frequency fs of the sample clock signal is synchronized with that of the reading signal immediately after transference of the pickup 1, the reproduction digital signal can be accurately reproduced while the rotation velocity of the spindle motor 2 is changed in the search operation, and the high speed access can be realized.

Figure 9:
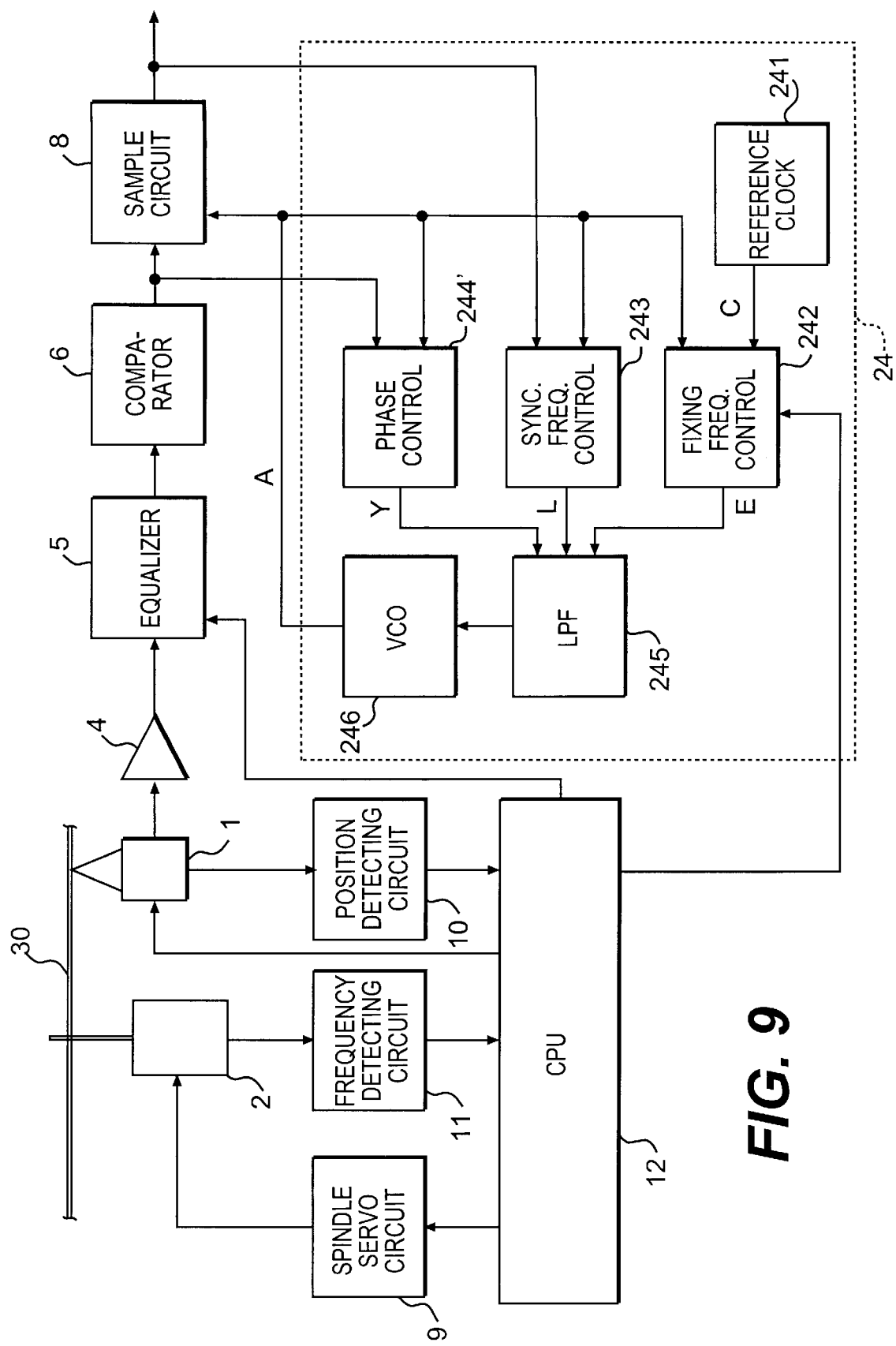
FIG. 9 is a block diagram showing a construction of another example of the digital signal reproducing apparatus of the present invention.

In addition, as shown in FIG. 9, the present invention can be adapted for a digital signal reproducing apparatus for reproducing a CD. In this case, the phase control circuit 244' is constructed by the same construction as the phase comparison circuit 71 shown in FIG. 10. Further, the CPU 12 is set in the frequency band of the equalizer 5 in accordance with the change of the frequency of the reading signal while the rotation velocity of the spindle motor is changed by the high speed access operation.

Further, the present invention can be adapted for the various reproduction forms. One reproduction form is that the CLV reproduction is carried out with respect to all of the reproduction zone of the CLV disc, i.e., DVD. Another reproduction form is that the CLV reproduction and the CAV reproduction are included in one disc. The other reproduction form is that plural linear velocity are included in one disc. In each of these reproduction forms, if the rotation velocity, the dividing ratio M and the reference value N are suitably set, the high speed access operation can be realized without giving a load to the spindle motor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A digital signal reproducing apparatus for reproducing digital signal, comprising:

a rotation control means for controlling a rotation velocity of a disc, on which information is recorded, in accordance with a predetermined linear velocity;

a reading means for reading said information from said rotated disc, and for generating a reading signal corresponding to said read information;

a clock signal generating means for generating a sample clock signal whose at least frequency is synchronized with a frequency of said reading signal;

a decoding means for decoding said digital signal from said reading signal on the basis of said sample clock signal; and a transferring means for transferring said reading means to a radius position of said disc in order to read said information recorded at said radius position of said disc by said reading means, said clock signal generating means comprising:

a frequency setting means for setting a desired frequency on the basis of said predetermined linear velocity and said radius position of said reading means;

a first frequency difference signal generating means for generating a first difference signal corresponding to a difference between said desired frequency and said frequency of said sample clock signal;

a second frequency difference signal generating means for generating a second difference signal corresponding to a difference between a frequency based on said digital signal and said frequency of said sample clock signal;

a phase difference signal generating means for generating a third difference signal corresponding to a difference between a phase based on said reading signal and a phase of said sample clock signal; and a synchronizing means for synchronizing at least said frequency of said sample clock signal with said frequency of the reading signal on the basis of at least one difference signal among said first difference signal, said second difference signal and said third difference signal.

2. A digital signal reproducing apparatus according to claim 1, wherein said synchronizing means equalizes at least said frequency of said sample clock signal with said frequency of the reading signal on the basis of said first difference signal immediately after transference of said reading means, and synchronizes at least said frequency of said sample clock signal with said frequency of the reading signal on the basis of at least one difference signal among said second difference signal and said third difference signal after said at least said frequency of said sample clock signal is equalized with said frequency of said reading signal.

3. A digital signal reproducing apparatus according to claim 1, wherein said frequency setting means sets said desired frequency on the basis of said predetermined linear velocity and a ratio of a radius position of said reading means before transference of said reading means and a radius position of said reading means after transference of said reading means.

4. A digital signal reproducing apparatus according to claim 1, wherein said second frequency difference signal generating means generates said second difference signal corresponding to a difference between a frequency which is an N (N indicates a integer) times as high as a frequency of a synchronization signal included in said digital signal and said frequency of said sample clock signal.

5. A digital signal reproducing apparatus according to claim 1, wherein said synchronizing means comprises a low pass filter and a voltage control oscillator, and said synchronizing means synchronizes at least said frequency of said sample clock signal with frequency of said reading signal by a first feedback loop comprising said low pass filter, said voltage control oscillator and said first frequency difference signal generating means, a second feedback loop comprising said low pass filter, said voltage control oscillator and said second frequency difference signal generating means, and a third feedback loop comprising said low pass filter, said voltage control oscillator and said phase difference signal generating means.

6. A digital signal reproducing apparatus according to claim 1, wherein said decode means comprises an A/D converter circuit for converting said reading signal to a series of a sampling value, and said phase difference signal generating means generates said third difference signal corresponding to said difference between a phase of said series of said sampling value and said phase of said sample clock signal.

7. A digital signal reproducing apparatus according to claim 1, wherein said decode means comprises a comparison means for comparing said reading signal with a predetermined reference voltage and for generating a binary signal corresponding to a result of comparison, and said phase difference signal generating means generates said third difference signal corresponding to said difference between a phase of said binary signal and said phase of said sample clock signal.

* * * * *